United States Patent [19]
Baechle et al.

[11] Patent Number: 5,711,154
[45] Date of Patent: Jan. 27, 1998

[54] SUPERCHARGED MULTICYLINDER INTERNAL COMBUSTION ENGINE WITH EXHAUST RECYCLING

[75] Inventors: Bernhard Baechle, Friedrichshafen; Dieter Schoenfeld, Markdorf; Martin Freitag, Friedrichshafen, all of Germany

[73] Assignee: MTU Motoren- und Turbinen-Union Friedrichshafen GmbH, Friedrichshafen, Germany

[21] Appl. No.: 593,676

[22] Filed: Jan. 29, 1996

[30] Foreign Application Priority Data

Jan. 28, 1995 [DE] Germany .................. 195 02 717.5

[51] Int. Cl.$^6$ .................................................. F02M 25/07
[52] U.S. Cl. ...................... 60/605.2; 123/568; 123/570
[58] Field of Search ...................... 60/605.2; 123/568, 123/569, 571

[56] References Cited

U.S. PATENT DOCUMENTS

| | | | |
|---|---|---|---|
| 4,249,382 | 2/1981 | Evans et al. | 60/605.2 |
| 5,203,830 | 4/1993 | Faletti et al. | 123/568 |
| 5,226,401 | 7/1993 | Clarke et al. | 123/571 |
| 5,517,976 | 5/1996 | Baechle et al. | 123/569 |

FOREIGN PATENT DOCUMENTS

| | | |
|---|---|---|
| 43 31 509 | 7/1994 | Germany . |
| WO 93/24748 | 12/1993 | WIPO . |

*Primary Examiner*—Miachel Koczo
*Attorney, Agent, or Firm*—Evenson, McKeown, Edwards & Lenahan, P.L.L.C.

[57] ABSTRACT

A supercharged multi-cylinder internal combustion engine is provided having exhaust recycling with air supply and exhaust outlet devices, variably controllable air intake and exhaust outlet valves, a first lubricating oil circuit, and an exhaust processing cylinder having a driven piston and a variable control for air intake and exhaust outlet valves on the exhaust processing cylinder. The air intake and exhaust outlet valves on the exhaust processing cylinder are each partially opened during a downward stroke of the driven piston of the exhaust processing cylinder by a control unit. A second lubricating oil circuit is provided for the exhaust processing cylinder.

10 Claims, 3 Drawing Sheets

SUPERCHARGED MULTICYLINDER INTERNAL COMBUSTION ENGINE WITH EXHAUST RECYCLING

BACKGROUND OF THE INVENTION

The invention relates to a supercharged multicylinder internal combustion engine with exhaust recycling and, more particularly, to a supercharged multicylinder internal combustion engine having air supply and exhaust outlet devices, variably controllable air intake and exhaust outlet valves, and a first lubricating oil circuit. The engine further has an exhaust processing cylinder with a driven piston and a variable control for air intake and exhaust outlet valves on the exhaust processing cylinder. The invention further relates to a method for operating a supercharged multicylinder internal combustion engine with exhaust recycling.

Exhaust recycling is a known measure for reducing nitrogen oxide emissions from diesel engines.

A method and a device for exhaust recycling in supercharged multicylinder internal combustion engines is described in WO 93/24748. Some of the cylinders of the internal combustion engine according to this prior art reference are operated with "loop scavenging" while the remaining cylinders are operated normally. The piston in a cylinder with loop scavenging completes a downward stroke with the exhaust outlet valve open and the air intake valve closed, so that exhaust is drawn exclusively from exhaust outlet devices on the internal combustion engine into the cylinder with loop scavenging. The exhaust is then compressed by the piston of the cylinder with loop scavenging with the exhaust outlet valve closed and the air intake valve closed, and then expanded. During an exhaust stroke of the piston of the cylinder during loop scavenging, the air intake valve is open and the exhaust outlet valve is closed, so that the exhaust is delivered from the cylinder during loop scavenging into air feed devices of the supercharged multicylinder internal combustion engine.

The disadvantages of this known method and device are as follows:

a) particles are introduced into the cylinders together with the recycled exhaust and cause increased wear therein;
b) the temperature of the cylinders exposed to the recycled hot exhaust rises;
c) radiators impacted directly by recycled exhaust in the air supply and exhaust outlet devices become contaminated; and
d) sulfuric acid or sulfurous acid enter the cylinders together with the recycled exhaust when water condenses.

Another device for reducing pollutants during operation of multicylinder internal combustion engines is known from German Patent document DE 43 31 509 C1. In this reference, first and second cylinders are provided which are separate in terms of their combustion technology. The first cylinders are connected with a first intake manifold and an exhaust system. Exhaust from the second cylinders is fed into the intake manifold through an exhaust recycling device. The second cylinders are supplied only with fresh air through a second intake line for minimum particle emission in the exhaust without taking $NO_x$ emissions into account. Although this device permits keeping the soot particles in the recycled exhaust at a constantly low level, it nevertheless suffers at least from the disadvantages that it is costly in design and that simple reduction of particle concentration in the recycled exhaust does not reliably prevent wear in the diesel engine.

There is therefore needed a supercharged multicylinder internal combustion engine with exhaust recycling which, with a low design cost, allows minimal amounts of particles or acid components to reach the cylinders together with the recycled exhaust, where they could lead to increased wear.

These needs are met by a supercharged multicylinder internal combustion engine having air supply and exhaust outlet devices, variably controllable air intake and exhaust outlet valves, and a first lubricating oil circuit. The engine further has an exhaust processing cylinder with a driven piston and a variable control for air intake and exhaust outlet valves on the exhaust processing cylinder. The air intake and exhaust outlet valves on the exhaust processing cylinder are each partially opened during a downward stroke of the driven piston of the exhaust processing cylinder by means of a control. A second lubricating oil circuit is provided for the exhaust processing cylinder. Further, these needs are met by a method for operating a supercharged multicylinder internal combustion engine with exhaust recycling which includes the steps of controlling the intake of the exhaust into the exhaust processing cylinder during a downward stroke of its piston by partially opening the air intake and exhaust outlet valves; supplying water to and atomizing water in the exhaust processing cylinder during a compression and expansion stroke of the piston; expelling gases from the exhaust intake cylinder through the air intake valve into the air supply devices; and supplying water from the exhaust processing cylinder to the second lubricating oil circuit.

According to the present invention, the supercharged multicylinder internal combustion engine with exhaust recycling has air supply and exhaust outlet devices, variably controllable air intake and exhaust outlet valves, pistons in the cylinders, and a first lubricating oil circuit. In addition to these cylinders, the internal combustion engine has an exhaust processing cylinder designed specially and individually, with a driven piston and variable control for air intake and exhaust outlet valves, whereby according to the invention the control partially opens the air intake and exhaust outlet valves on the exhaust processing cylinder during a downward stroke of the piston, driven by a crankshaft of the exhaust processing cylinder, so that depending on the load state of the internal combustion engine, the amounts of air and exhaust can be metered. The air intake valve of the exhaust processing cylinder, for example, can be opened briefly during a downward stroke of the piston and the exhaust outlet valve can be opened for a long time so that high exhaust recycling rates are achieved. Alternatively, intake valve of the exhaust processing cylinder can be opened for a long time during a downward stroke of the piston and the exhaust outlet valve opened briefly, so that low exhaust recycling rates are achieved with a simultaneous cooling of the recycled exhaust by relatively cold charging air. The invention also provides a second lubricating oil circuit exclusively for the exhaust processing cylinder. The second lubricating oil circuit removes particles from the exhaust and prevents them from penetrating the other, normally operated cylinders of the internal combustion engine. The second lubricating oil circuit can be provided with additives to neutralize acid components that enter the lubricating oil.

The multicylinder internal combustion engine that is supercharged according to the present invention in a preferred embodiment for exhaust cooling and for exhaust scrubbing has an exhaust processing cylinder with a water supply device. Water in the exhaust processing cylinder binds particles from the exhaust and releases sulfur oxides. The contaminated water enters the lubricating oil circuit of the exhaust processing cylinder.

According to one embodiment of the present invention, a separator is provided for cleaning the lubricating oil and for separating the lubricating oil from water in the second lubricating oil circuit.

The water that leaves the separator, according to one embodiment of the invention, can be fed to the water supply device.

Preferably, the supercharged multicylinder internal combustion engine according to the invention has a charging air cooler in air supply devices. A line for condensation water is provided from the charging air cooler to the water supply device so that water losses can be kept low overall and water recovered from condensation can be fed to the exhaust processing cylinder.

According to one embodiment of the invention, an exhaust duct from the exhaust processing cylinder terminates directly in an exhaust outlet of a cylinder adjacent to the exhaust processing cylinder. The adjacent cylinder is arranged so that it is supplied with fresh air without exhaust from the air supply devices and fuel is burned in a particle-optimized fashion. The exhaust containing the few particles from the adjacent cylinder is fed from the exhaust processing cylinder to the air supply lines of the remaining cylinders operating in a normal four-cycle mode.

According to another embodiment of the present invention, an exhaust duct runs from the exhaust processing cylinder into the exhaust outlet devices and terminates downstream from a turbine in the exhaust outlet devices. The pressure and temperature of the exhaust are considerably reduced after passing through the turbine so that temperature increases in the cylinders are reduced by the recycled exhaust.

A process according to the present invention for operating the supercharged multicylinder internal combustion engine is accomplished by variably controlling the intake of exhaust into the exhaust processing cylinder during a downward stroke of its piston, supplying and atomizing water in the exhaust processing cylinder during a compression and an expansion stroke of this piston, expelling the gases from the exhaust processing cylinder through the air intake valve into the air supply devices, and supplying water from the exhaust processing cylinder to a second lubricating oil circuit. According to this process, the exhaust is processed and cooled before being supplied as combustion air to the normally operating cylinders of the internal combustion engine.

Other objects, advantages and novel features of the present invention will become apparent from the following detailed description of the invention when considered in conjunction with the accompanying drawings.

DETAILED DESCRIPTION OF THE DRAWINGS

Figure 1:
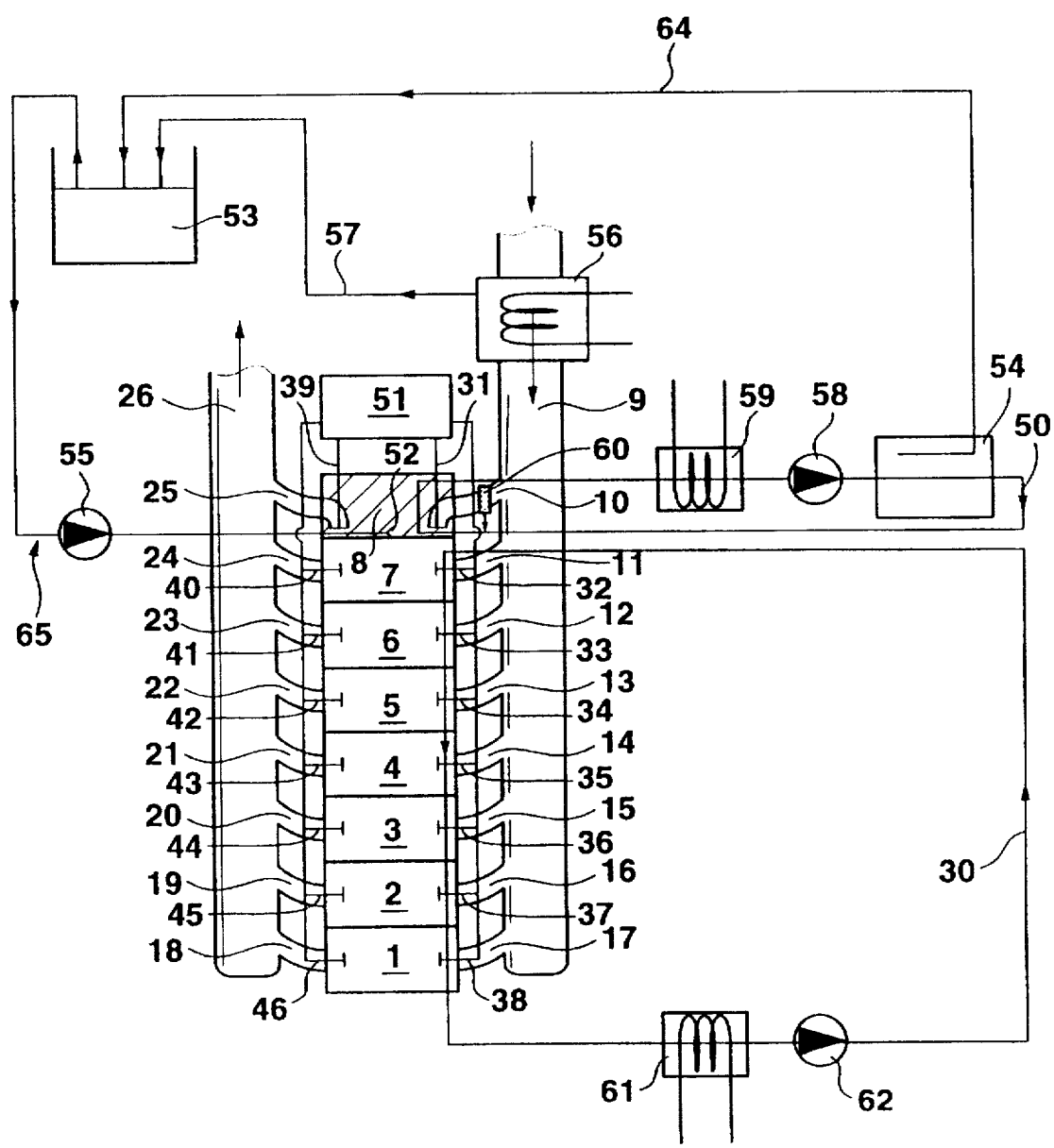
FIG. 1 is a schematic block diagram of an internal combustion engine with an exhaust processing cylinder.

FIG. 1 shows a supercharged multicylinder internal combustion engine with cylinders 1–7 arranged in-line. An exhaust processing cylinder 8 is likewise provided in line with cylinders 1–7. Cylinders 1–7 are provided with a first lubricating oil circuit 30. In the first lubricating oil circuit 30, an oil cooler 61 and an oil pump 62 are provided for delivering lubricating oil through the circuit 30. Cylinders 1–7 and exhaust processing cylinder 8 are connected in a conducting manner with a valve control unit 51 and are provided with variably controllable air intake (31–38) and exhaust outlet (39–46) valves. The valve control unit 51 can readily be designed by one of ordinary skill in the art to perform the functions described herein. The piston of the exhaust processing cylinder 8 is driven by the crankshaft (not shown) of cylinders 1–7. The exhaust processing cylinder 8 is provided with a second lubricating oil circuit 50 that is separate from the first lubricating oil circuit 30, as well as a water supply device 52. The second lubricating oil circuit 50 can be provided with a separate oil pan (not shown), a separator 54, and an oil pump 58, as well as special lubricating oil or special additives. The lubricating oil in the second lubricating oil circuit 50 of the exhaust processing cylinder 8 is purified in the separator 54.

The separator 54, in particular, separates lubricating oil from water, which then is recycled into the water supply device 52. An oil cooler 59 is provided upstream from the separator to cool the lubricating oil of the second lubricating oil circuit 50, laden with water and contaminants, to a desired temperature level.

The water supply device 52 comprises a circuit 65 in which water is drawn from a supply container 53 by means of a pump 55, then delivered and possibly sprayed by a water injector into the processing cylinder 8.

From a compressor (not shown), a duct 9 passes through intake elbows 10–17 to the cylinders 1–7 and to the exhaust processing cylinder 8. From the cylinders 1–7 and the exhaust processing cylinder 8, outlet elbows 18–20 depart and terminate in a duct 26 that leads to a turbine (not shown).

The cylinders 1–7 operate in a normal four-cycle mode while the air intake 31 and the exhaust outlet valves 39 are controlled by the exhaust processing cylinder 8 so that the exhaust from the cylinders 1–7 is delivered from the exhaust outlet devices 18–26 through the exhaust processing cylinder 8 to the air supply devices 9–17 for the cylinders 1–7. A charging air cooler 56 is included in the air supply devices 9–17. A line 57 serves to carry condensation water from the charging air cooler 56 to the water supply device 52.

Figure 2:
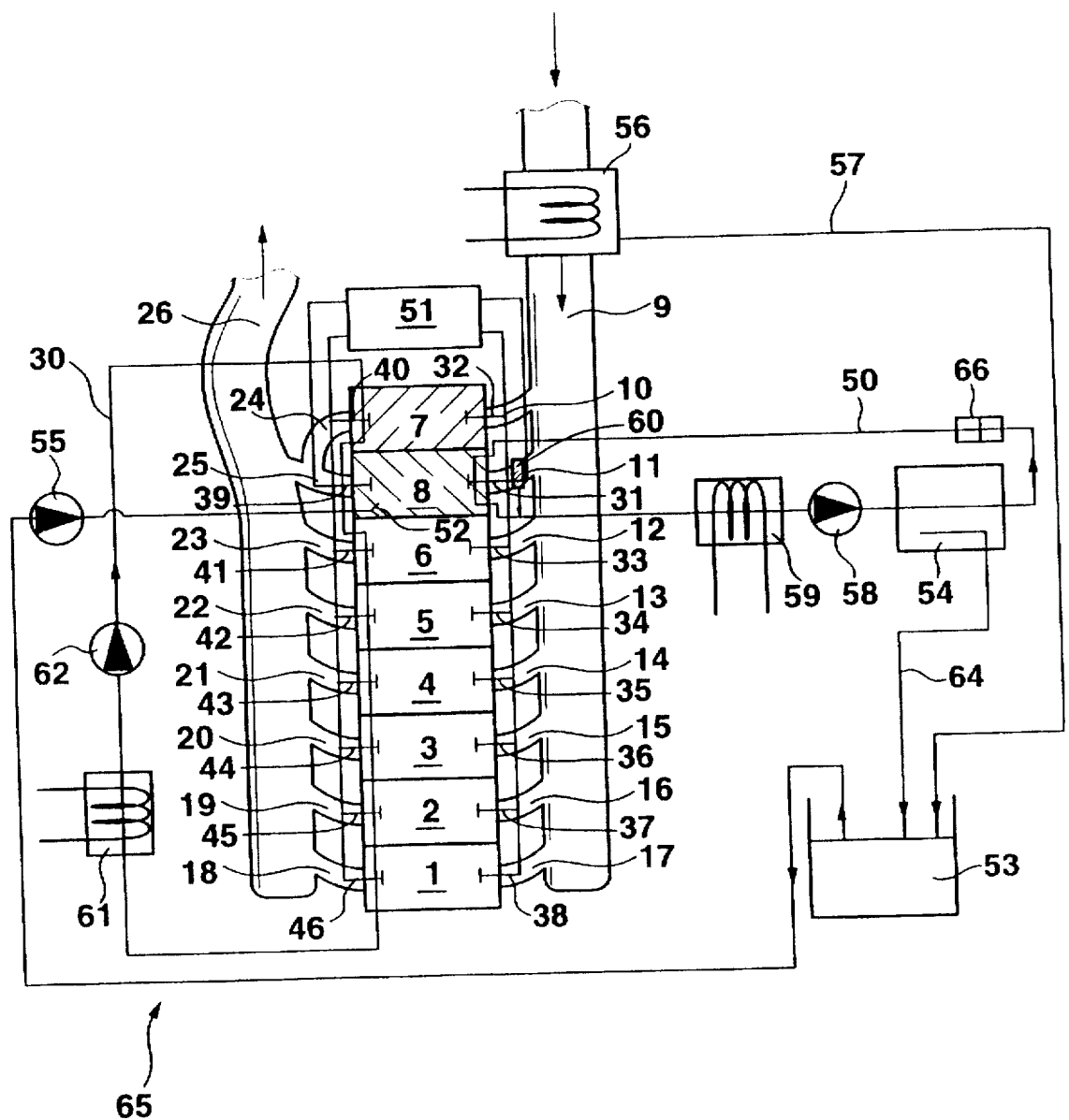
FIG. 2 is a schematic block diagram of an internal combustion engine with an exhaust processing cylinder and a cylinder with particle-optimized combustion.

In a further embodiment shown in FIG. 2, corresponding features are given the same reference numerals as in FIG. 1. Exhaust processing cylinder 8 is provided with air from the channel 9 to the cylinder 7. The cylinder 7, which is initially pressurized with air from the channel 9, has an outlet elbow 24 that terminates in an outlet elbow 25 of the exhaust processing cylinder 8.

The cylinders 1–7 operate in a normal four-cycle mode while the air intake and exhaust outlet valves 31 and 39 respectively are controlled by the exhaust processing cylinder 8 in such fashion that exhaust is delivered from the exhaust outlet elbow 24 through the exhaust processing cylinder 8 to the air supply devices 9–16 for the cylinders 1–6. The cylinder 7 is supplied exclusively with exhaust-free air, so that the exhaust from the cylinder 7 contains only a few particles and the exhaust from cylinders 1–6 recycled from the exhaust processing cylinder 8 to the air supply devices 12–17 contains only a few harmful particles.

Figure 3:
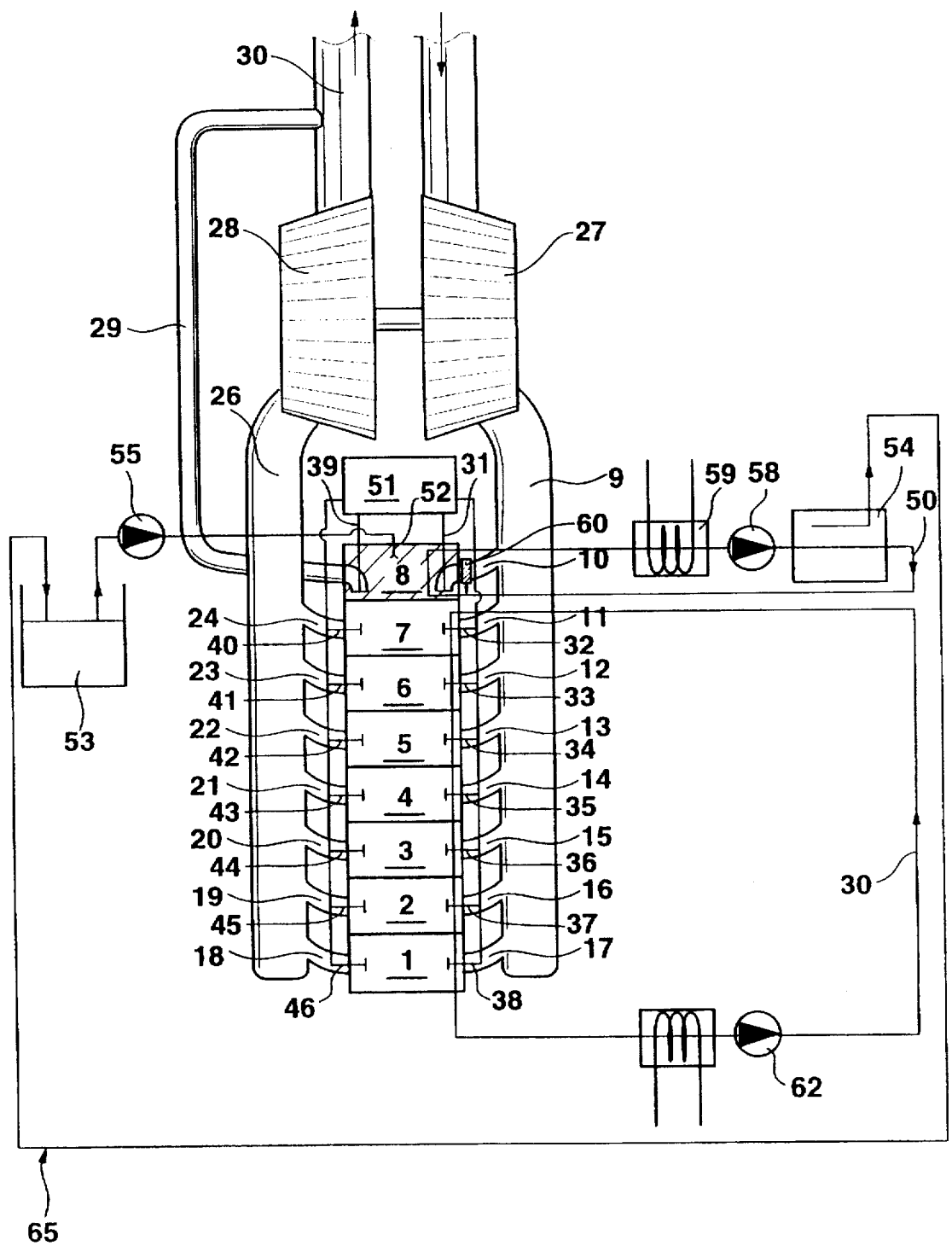
FIG. 3 is a schematic block diagram of an internal combustion engine with an exhaust processing cylinder and an exhaust duct.

In a further embodiment shown in FIG. 3, corresponding features are given the same reference numerals as in FIGS. 1 and 2. From a compressor 27, the duct 9 leads through the intake elbows 10–17 to the cylinders 1–7 and to the exhaust processing cylinder 8. From the cylinders 1–7, outlet elbows 18–24 depart and terminate in a channel 26 leading to a turbine 28. From the exhaust processing cylinder 8, a duct 29 leads to a connection 30 downstream from the turbine 28, where the exhaust from the cylinders 1–7 is throttled and cooled.

The cylinders 1–7 operate in a normal four-cycle mode while the air intake and exhaust outlet valves 31 and 39 of the exhaust processing cylinder 8 are controlled so that exhaust is delivered from the connection 30 downstream of the turbine 28 through the exhaust processing cylinder 8 to the air inlet devices 9–17 for the cylinders 1–7.

The method for operating the supercharged multicylinder internal combustion engine with exhaust recycling will now be described.

Depending on the load state of the supercharged multi-cylinder internal combustion engine with exhaust recycling, during a downward stroke of the piston of the exhaust processing cylinder 8, as a result of the variably controlled intake, namely through a partial opening of the exhaust outlet valve 39, the exhaust moves from the exhaust outlet devices 18–26, and with a partial opening of the air inlet valve 31, air moves from the air inlet devices 9–17 into the exhaust processing cylinder 8.

During a compression and expansion stroke, water is supplied to the exhaust processing cylinder 8 and atomized by the piston. The water serves for cooling and for scrubbing the exhaust by binding particles and dissolving sulfur oxides.

During an exhaust stroke, the exhaust passes from the exhaust processing cylinder 8 through the air intake valve 31 into the air supply devices 9–17. By means of a separator device 60 for separating water from the exhaust partial stream in a charging air duct 10 of the exhaust processing cylinder 8, water is prevented from entering the air supply devices 9–17 during the exhaust stroke when the duct on the charging air side is open. The water goes from the exhaust processing cylinder 8 through the separator device 60 into the second lubricating oil circuit 50, where, by means of suitable additives, the acidic nature of the lubricating oil or of the contaminated water can be neutralized. Separator 54 in the second lubricating oil circuit 50 separates the water from the lubricating oil so that the water, after treatment in this fashion, can be recycled through the line 64 into the supply container 53 and can be reused for cooling and cleaning. The water supply 53 can be topped-off with water from the charging air cooler 56. The solid impurities in the lubricating oil can be trapped by suitable oil filters 66 and separated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A supercharged multi-cylinder internal combustion engine, comprising:

air supply and exhaust outlet devices for the internal combustion engine;

a first lubricating oil circuit for the internal combustion engine;

variably controllable air intake and exhaust outlet valves for cylinders of the internal combustion engine;

an exhaust processing cylinder having a driven piston and an air intake and exhaust outlet valve;

a valve control unit coupled to said air intake and exhaust outlet valves, said valve control unit partially opening the air intake and exhaust outlet valve on the exhaust processing cylinder during a downward stroke of said driven piston; and a second lubricating oil circuit provided for said exhaust processing cylinder.

2. The supercharged multi-cylinder internal combustion engine according to claim 1, further comprising a water supply device connected to said exhaust processing cylinder.

3. The supercharged multi-cylinder internal combustion engine according to claim 1, further comprising a separator operatively arranged for cleaning lubricating oil in said second lubricating oil circuit.

4. The supercharged multi-cylinder internal combustion engine according to claim 2, further comprising a separator for separating water and lubricating oil in said second lubricating oil circuit.

5. The supercharged multi-cylinder internal combustion engine according to claim 3, further comprising a water supply device connected to said exhaust processing cylinder, and a line coupling said separator to said water supply device for supplying water separated from said separator to said water supply device.

6. The supercharged multi-cylinder internal combustion engine according to claim 4, further comprising a line coupling said separator to said water supply device for supplying water separated from said separator to said water supply device.

7. The supercharged multi-cylinder internal combustion engine according to claim 2, further comprising:

a charging air cooler contained in a duct of said air supply devices; and a line coupling said charging air cooler to said water supply device for carrying condensation water from the charging air cooler to the water supply device.

8. The supercharged multi-cylinder internal combustion engine according to claim 1, further comprising:

an exhaust duct extending from the exhaust processing cylinder, said exhaust duct terminating directly in an exhaust outlet of an adjacent cylinder of the multi-cylinder internal combustion engine; and wherein said adjacent cylinder is arranged such that it is supplied with fresh air without exhaust from the air supply devices.

9. The supercharged multi-cylinder internal combustion engine according to claim 1, further comprising:

an exhaust duct from the exhaust processing cylinder; and a turbine arranged in a duct of the exhaust outlet devices;

wherein said exhaust duct terminates downstream from said turbine.

10. A method for operating a supercharged multi-cylinder internal combustion engine having exhaust recycling and including air supply and exhaust outlet devices, variably controllable air intake and exhaust outlet valves, a first lubricating oil circuit, and an exhaust processing cylinder having a driven piston and a variable control unit for the air intake and exhaust outlet valves on the exhaust processing cylinder, the method comprising the steps of:

variably controlling an intake of exhaust into the exhaust processing cylinder during the downward stroke of the driven piston by partially opening the air intake and exhaust outlet valves;

supplying water to and atomizing water in said exhaust processing cylinder during a compression and an expansion stroke of said driven piston;

expelling gases from said exhaust processing cylinder through the air intake valve into the air supply devices; and supplying water from said exhaust processing cylinder to a second lubricating oil circuit.

* * * * *